US006598515B1

(12) United States Patent
Bove'

(10) Patent No.: US 6,598,515 B1
(45) Date of Patent: Jul. 29, 2003

(54) APPARATUS FOR PROCESSING A PRODUCT

(76) Inventor: Meenakshi J. Bove', 2 Jefferson Run Rd., Great Falls, VA (US) 22066

( * ) Notice: Subject to any disclaimer, the term of this patent is extended or adjusted under 35 U.S.C. 154(b) by 0 days.

(21) Appl. No.: 09/672,005

(22) Filed: Sep. 29, 2000

(51) Int. Cl.$^7$ ................................................ A47J 27/04
(52) U.S. Cl. ............................ 99/407; 99/415; 99/418; 99/449; 99/450; 220/485; 220/573.1; 220/912
(58) Field of Search ........................ 99/403, 407, 415, 99/418, 449, 450; 220/485–495, 573.4, 912, 573.1

(56) References Cited

U.S. PATENT DOCUMENTS

| | | | |
|---|---|---|---|
| 814,250 A | * 3/1906 | Toler | |
| 949,453 A | * 2/1910 | Steger | |
| 1,193,353 A | * 8/1916 | Brown | |
| 1,272,222 A | * 7/1918 | Clayton | |
| 1,519,510 A | * 12/1924 | Santarsiero | |
| 1,579,636 A | * 4/1926 | Borgnis | |
| 2,562,433 A | * 7/1951 | Moore | 99/319 |
| 3,020,823 A | * 2/1962 | Musso | 99/287 |
| 3,324,787 A | * 6/1967 | McCleary | 99/319 |
| 5,584,235 A | 12/1996 | DuBois et al. | |
| 5,653,161 A | 8/1997 | Nopanen et al. | |
| 5,794,524 A | 8/1998 | Kemker et al. | |
| 5,826,494 A | * 10/1998 | Wang | 99/340 |
| 5,896,810 A | * 4/1999 | Barbour | 99/415 |
| 5,993,878 A | 11/1999 | Tippmann | |

* cited by examiner

Primary Examiner—Keith Hendricks
Assistant Examiner—Drew Becker
(74) Attorney, Agent, or Firm—Eli D. Eilbott

(57) ABSTRACT

An apparatus and method of processing a product, such as food product, are disclosed. Untreated product is placed inside a bottom-unloading basket that is, in turn, placed within a covered vessel. For processing a food product, a porous steamer apparatus is provided for insertion into a covered cooking vessel. The steamer apparatus is comprised of two unfastened pieces, a basket and a support base, each of which has a plurality of small holes through which steam, but not food product, may pass. The basket holds the food product, is roughly cylindrical in shape, has an open-ended top and an open-ended bottom, and rests firmly upon, but is not fastened to, the support base during the steam-cooking process. The support base has an inverted conical shape and a vertical pole that has a hook-shaped upper terminus and that is integrally-connected to and protruding above and below the uppermost point of the support base. A perforated, closed spice container is removably fastened to the pole at a point underneath the support base. During the pressurized steam-cooking process, a pressure dome is removably fastened onto the cooking vessel. Upon completion of the steam-cooking process, the pressure dome is unfastened from the vessel and the basket is lifted out of the vessel, thereby releasing all of the food product directly into the vessel, and the support base, due to its inverted conical shape and hooked upper end, is easily lifted up through the cooked food product and out of the vessel, simultaneously with the spice container. An agitator dome having integrally-connected mixing blades is then removably fastened onto the top of the vessel, and the food product is mechanically mixed at ambient atmospheric pressure.

11 Claims, 9 Drawing Sheets

APPARATUS FOR PROCESSING A PRODUCT

BACKGROUND OF THE INVENTION

1. Field of the Invention

The present invention relates to an apparatus and method for processing a product. More particularly, the present invention relates to a bottom-unloading product basket for placement in a processing vessel and methods using same.

2. Description of Related Technology

Processing products in treatment vessels is known in the art for many applications and in many industries. For example, cooking a food product through exposure to culinary steam, at either elevated pressure or at ambient atmospheric pressure, has been known for many years. Prior art steam-cooking processes often include a method for using the steam as a transfer medium for infusing the food product with spices and flavorings. Moreover, various methods exist for mechanically mixing a cooked food product to attain uniform texture, consistency and taste.

For instance, U.S. Pat. No. 5,993,878 discloses an apparatus and method of producing a food product. The food product is placed inside an air-tight chamber, in which the food product is to be cooked, wherein steam is generated from a source of water and is introduced into the cooking chamber. The steam heats the inside of the cooking chamber and serves as a heat transfer medium to heat the food product as well as a color and flavor transfer medium to color and flavor the food product. Flavoring and coloring additive, such as liquid smoke, may be added to the water utilized in generating the steam in order to flavor the food product being cooked. The steam then transfers the flavoring and coloring additive to the food product which condenses on the food product adding flavor and color to the food product.

U.S. Pat. No. 5,794,524 discloses a food processor with a mixing vessel and a drive mechanism for an agitator in the mixing vessel, the lower region of which can be heated. A top unit for the mixing vessel has a perforated base to allow food to be steam-cooked. The perforations are formed in a support plate in the base of the top unit and condensation and moisture are led back into the mixing vessel.

U.S. Pat. No. 5,653,161 discloses a food steamer having a base, a combined support and collector, and a cooking bowl. The base has a heater and a reservoir for holding water to be heated into steam. The cooking bowl is mounted on top of the base and has a bottom with holes. The combined support and collector has a frame and a screen. The frame is mounted to the base between the heater and the cooking bowl. The frame has a center aperture with the screen located therein for supporting flavoring items thereon. The frame has raised walls to form a condensed steam holding area for holding all condensed steam that has traveled into and then back out of the holes in the cooking bowl. The frame also has a side wall with inwardly recessed grooves and holes through the frame at the tops of the grooves. These form pressure release vents at the sides of the frame.

U.S. Pat. No. 5,584,235 discloses a food steamer having a base, a combined support and collector, and a cooking bowl. The base has a heater and a reservoir for holding water to be heated into steam. The cooking bowl is mounted on top of the base and has a bottom with holes. The combined support and collector has a frame and a screen. The frame is mounted to the base between the heater and the cooking bowl. The frame has a center aperture with the screen located therein for supporting flavoring items thereon. The frame has raised walls to form a condensed steam holding area for holding all condensed steam that has traveled into and then back out of the holes in the cooking bowl.

Ordinarily, steam-cooking involves placing a food product within or on a bowl-shaped apparatus having a plurality of small holes throughout the bottom surface and sides, and either positioning the apparatus above a quantity of potable water that is heated into steam or placing the apparatus within a covered vessel into which culinary steam is introduced. Typically, the bottom surface of the bowl-shaped apparatus holding or containing the food product to be steam-cooked is integrally fastened to the sides thereof, and has a plurality of small holes that allow steam, but not food product, to pass through. Removal of the food product from the bowl-shaped apparatus after completion of the steam-cooking process usually involves the tilting or inversion of the apparatus to release the food product. In addition, steam-cooking of a food product often is performed in a closed vessel under elevated atmospheric pressure.

Moreover, certain food products may be subjected to further processing subsequent to steam-cooking. For example, it may be desirable for a food product that has been steam-cooked at elevated atmospheric pressure then to be mechanically mixed at a non-elevated pressure, either to add spices or flavorings or to attain a uniform or otherwise more desirable taste, texture or consistency. To subject the steamed food product to a mechanical mixing process, the food product usually is transferred from the cooking vessel in which the steam-cooking was performed into a second cooking vessel in which mechanical mixing will be performed. Such transfer commonly is accomplished through the use of vessel-to-vessel pipes and pipe pumping equipment or through the hoisting and removal of the food product from the first vessel and placement into the second vessel. Furthermore, the second vessel may be equipped with integrally-attached agitators, blades or scrapers to mix or blend the steam-cooked food product. The need for multiple vessels for such multi-step processing is particularly evident where the first cooking vessel is designed and equipped to steam-cook food products at elevated pressure in a closed environment and the subsequent mechanical food product mixing step also needs to be accomplished in a covered vessel but at ambient atmospheric pressure.

In commercial-scale food processing operations, it is common for food products to be steam-cooked in very large batches by placing the food products into a large, bowl-shaped, perforated apparatus that is, in turn, placed into a closable cooking vessel having a capacity of 50 gallons or more. Such large quantities of food product can weigh hundreds of pounds or more and thus typically necessitate the use of sophisticated hoisting and tilting equipment, not only to remove the bowl-shaped apparatus from the cooking vessel after completion of the steam-cooking step, but also to remove the cooked food product from the bowl-shaped apparatus itself, and then to place the cooked food product into a second vessel for mechanical mixing, blending or other further processing.

In addition, selected flavors are often added to food products during steam-cooking processes, typically either by placing the whole, non-extract, non-concentrate form of spices (e.g., whole bay leaves, whole vanilla beans, whole peppercorns) directly into a covered vessel in which steam-cooking occurs or into a closed, perforated container that is placed within the vessel, thereby facilitating steam-infusion of the spices into the food product. Alternatively, flavoring of food products during steam-cooking processes is frequently accomplished through the addition of an extract, concentrate form of spices directly into the food product, thereby enabling the spices to be fully absorbed into the food product.

As will be appreciated by one of ordinary skill in the art, there are numerous other industries and fields wherein a product is processed in one or more treatment vessels. For example, it is common in the commercial waste management industry for waste materials to be treated to reduce the toxicity or mobility of chemical compounds in such materials by subjecting the materials to thermal energy within a closed vessel and subsequently subjecting the materials to further treatment, such as mechanical mixing or agitation, in the same or a second vessel. Similarly, concrete production or mining-related activities may involve the use of multiple vessels to accomplish heating and subsequent mixing or sorting of naturally-occurring materials such as sand or rocks.

SUMMARY OF THE INVENTION

The foregoing underscores some of the problems associated with conventional product processing techniques which require multiple vessels and/or lifting and/or tilting equipment. Furthermore, the foregoing highlights the need for an apparatus and method for processing a product using a bottom-unloading product basket which may preclude the need for multiple vessels and/or lifting and/or tilting equipment to process the product.

For example, the prior art does not disclose an apparatus nor a method that enables both steam-cooking at above-atmospheric pressure and mechanical mixing at ambient atmospheric pressure to be performed sequentially in a single covered vessel. Instead, it is typical in the food processing industry to use a separate vessel or container for each of the separate food processing steps that are applied to a particular food product, such as pressurized steam-cooking and non-pressurized mixing or blending. Moreover, prior art does not disclose an apparatus nor a method that enables a food product to be directly released from the bottom of a steamer basket apparatus without the need to invert or tilt such basket so as to discharge its food product contents. Instead, it is typical for the bottom surface of a steamer basket apparatus to be integrally fastened to the sides thereof, and not to be designed to be opened or otherwise separated from such sides, thereby necessitating the use of complex and expensive hoisting and tilting equipment to remove cooked food product from such an apparatus, particularly during commercial-scale processing of large quantities of food product.

The need to purchase, operate and maintain hoisting and tilting equipment to remove steam-cooked food product from a steamer basket, as well as the common practice of using multiple vessels to accomplish multi-step processing of a food product, add undesirable inefficiency, time, expense and food handling steps to the food preparation process. The additional exposure, handling and movement of food product, in turn, tend to cause loss of minerals, vitamins, spices and the like, and thus diminish the nutritional value and flavor of the steam-cooked food, and to increase the risk that the food product may be exposed to harmful bacteria during processing.

In addition, prior art does not disclose an apparatus nor a method that both enables the whole, non-extract, non-concentrate form of spices to be used to steam-infuse flavor into a food product within a cooking vessel, and further enables such spices to be removed from the vessel following completion of the steam-cooking process without the need to filter the cooked food product. On the other hand, where flavor enhancement of steam-cooked food product is accomplished through the use of the extract form of spices, no filtration or removal of the spices is required, but the extracts frequently contain undesirable additives, including alcohols, resins and oils, that are necessary to promote the absorption of the spice into the food product.

In light of the foregoing shortcomings and limitations of the prior art, a need exists for an apparatus that can hold food product while the food product is steam-cooked at above-atmospheric pressure in a closed cooking vessel, and which apparatus is bottom-unloading and therefore can be removed from the cooking vessel upon completion of the steam-cooking process without having to remove any of the food product from the cooking vessel as well. A further need exists for a method that enables food product to be both steam-cooked at above-atmospheric pressure and then mechanically mixed at ambient atmospheric pressure in a single closed vessel. An additional need exists for a method that enables food product in a closed vessel to be steam-infused with selected flavors using whole spices that may be easily removed from the vessel and that need not be filtered out of the cooked food product.

It is a primary object of the present invention to overcome the aforementioned shortcomings and limitations associated with the prior art by providing a new apparatus and method for processing a product. In accordance with this object of the invention, there is provided an apparatus for processing a product comprising a bottom-unloading product basket adapted for insertion in a treatment vessel. According to this aspect of the invention, a feature of the invention allows product treated in the basket to be unloaded and the basket removed from the vessel without the need for lifting or tilting equipment, whereby the product may be subjected to further processing in the same vessel.

It is another object of the invention to provide a new apparatus and method for processing food products. According to one aspect of the invention, there is provided an apparatus and method for preparing a food product through steam-cooking at above-atmospheric pressure followed by mechanical mixing of the steamed food product, at ambient atmospheric pressure, in a single covered vessel.

In accordance with another aspect of the present invention, there is provided an apparatus and method for preparing a food product in a single covered vessel, wherein a bottom-unloading perforated steamer basket holds the food product above the water level within the vessel during a steam-cooking process and, after completion of the steam-cooking process, all of the food product may be easily released from the bottom of the steamer basket directly into the vessel, and the empty steamer basket may then be removed from the vessel without having to remove any of the food product from the vessel as well.

In accordance with one advantageous feature of the invention, there is provided the aforementioned apparatus and method for preparing a food product in a single covered vessel, wherein a two-piece perforated steamer basket holds the food product above the water level within the vessel during a steam-cooking process and, after completion of the steam-cooking process, all of the food product may be easily released from the steamer basket directly into the vessel, and both pieces of the steamer basket may then be removed from the vessel without having to remove any of the food product from the vessel as well.

In accordance with another advantageous feature of the invention, there is provided the aforementioned apparatus and method for preparing a food product in a single covered vessel, wherein the vessel may be operated with either one of two domes secured in place, one of which is removably fastened to the top of the vessel during a pressurized steam-cooking process, and the other of which is removably fastened to the top of the vessel during a non-pressurized mechanical mixing process.

In accordance with yet another advantageous feature of the invention, there is provided the aforementioned apparatus and method for preparing a food product in a single covered vessel, wherein the source of the steam for cooking the food product is either a measured quantity of potable water which has been introduced into the bottom interior of the vessel, or culinary steam which has been introduced directly into the interior of the vessel, and wherein some or all of the water and other liquids remaining within the vessel after completion of the steam-cooking process is mixed with and fully incorporated into the food product during the mechanical mixing process, thereby restoring to the cooked food product nearly all nutrients, minerals and flavor that may have been lost or released from the food product during the steam-cooking process.

It is another feature of the invention is to provide the aforementioned apparatus and method for preparing a food product in a single covered vessel, wherein a perforated, closed container holding the whole, non-extract, non-concentrate form of various spices is removably fastened to a food product steamer basket at a point below the top of the water level in the vessel, to facilitate the infusion of selected flavors into the food product during the steam-cooking process and to enable the spices and container to be easily removed from the vessel simultaneously with removal of the steamer basket.

These and other objects, aspects and features of the invention may be realized by the provision of an apparatus comprising a bottom-unloading steamer basket which holds a product during processing within a covered treatment vessel, and which basket enables such product to be released directly from the bottom of the basket and into the vessel. Related objects may be realized by the provision of a method of processing a product through the application of both thermal energy at above atmospheric pressure and mechanical energy at ambient atmospheric pressure in a single covered treatment vessel.

As will be appreciated by one of ordinary skill in the art, an apparatus according to the invention may be suitable for use in any field or industry requiring the processing of a product in a treatment vessel. Accordingly, the present invention should not be viewed as limited to any particular use or use in any particular industry. Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Copyright Notice pursuant to 40 C.F.R. §1.71 (2000): A portion of the disclosure of this patent application, namely the accompanying drawings, contain material which is subject to copyright protection. The inventor of the present invention is the copyright owner for such drawings and has no objection to the facsimile reproduction by anyone of the patent document or the patent disclosure, as it appears in the Patent and Trademark Office patent file or records, but otherwise reserves all copyright rights whatsoever.

The drawing figures depict the present invention by way of example, not by way of limitations. In the figures, like reference numerals refer to the same or similar elements.

DETAILED DESCRIPTION OF THE INVENTION

Generally, the present invention relates to an apparatus and method for processing a product. According to a presently preferred embodiment, the present invention provides an apparatus and method for preparing a food product in a single covered vessel, wherein a bottom-unloading perforated steamer basket holds the food product above the water level within the vessel during a steam-cooking process and, after completion of the steam-cooking process, all of the food product may be easily released from the bottom of the steamer basket directly into the vessel, and the empty steamer basket may then be removed from the vessel without having to remove any of the food product from the vessel as well.

While the present invention is described in connection with the processing of food products, it will be readily appreciated by one of ordinary skill in the art that the apparatus, method and teachings of the present invention can be applied to other fields and industries where products are processed in treatment vessels. Accordingly, the invention should not be viewed as being limited to any particular product or industry.

Figure 1:
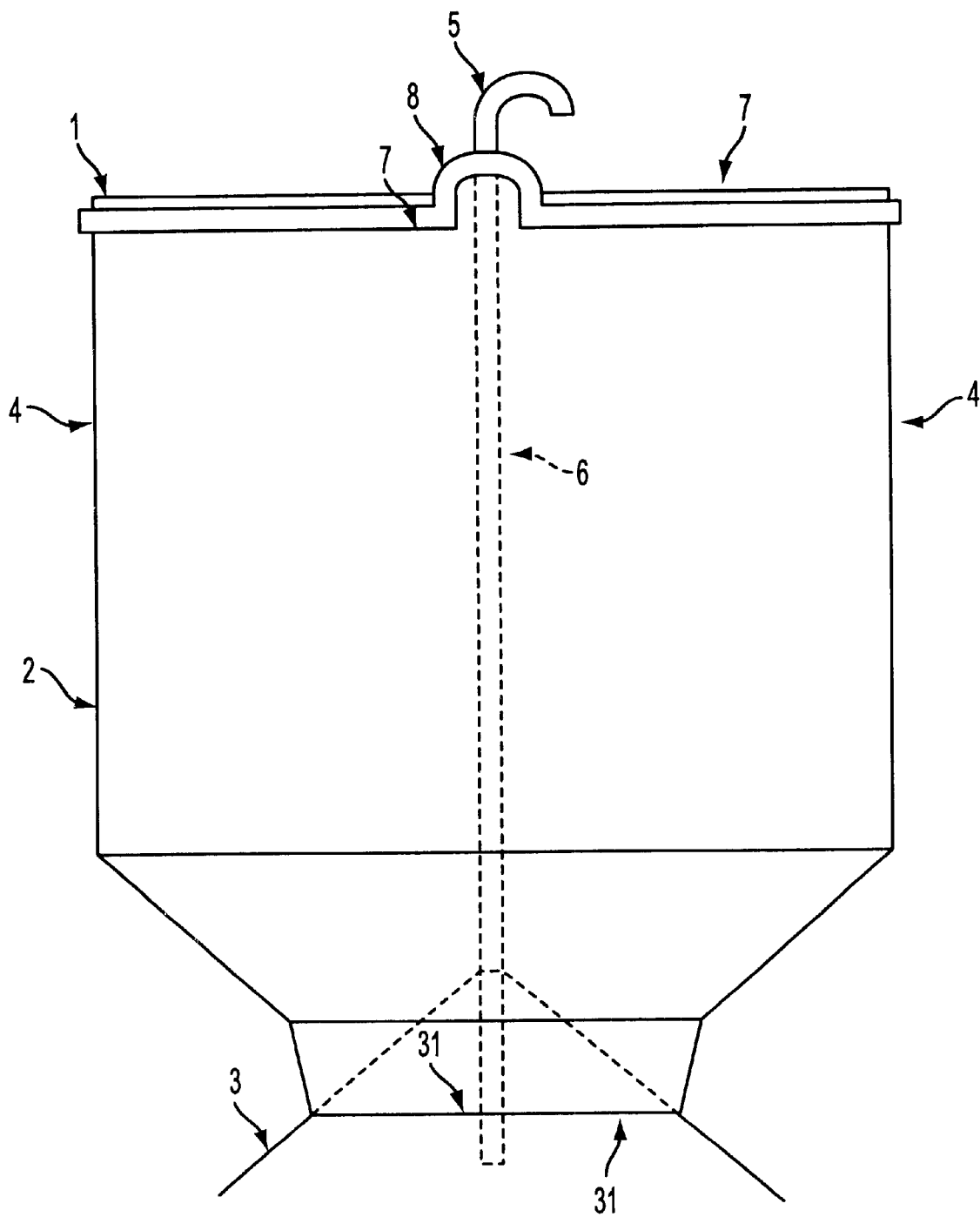
FIG. 1 is a cross-sectional view of a two-piece steamer apparatus according to the invention, with a bottom-unloading basket separably resting on a support cone.
Figure 4:
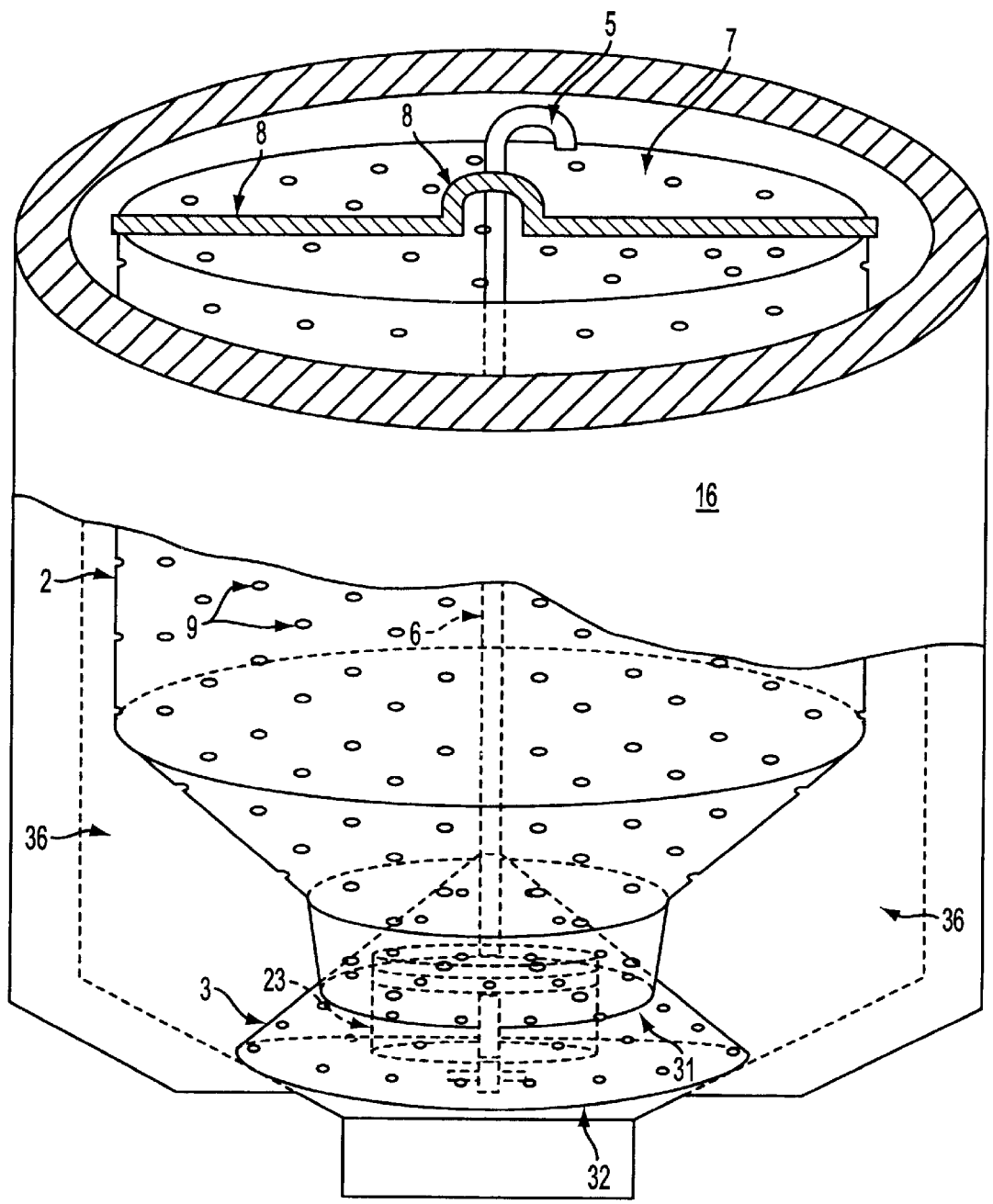
FIG. 4 is an isometric view of an uncovered cooking vessel, with a cross-sectional view of the two-piece steamer apparatus of FIG. 1 and a spice container inside the vessel.

In accordance with a presently preferred embodiment, there is provided an apparatus for treatment of a food product. Referring to FIG. 1, there is shown a cross-sectional view of a two-piece steamer apparatus 1 according to the invention, wherein a bottom-unloading basket 2 separably rests on a support cone 3. As depicted in FIG. 1, the basket 2 is configured to mate with the support cone 3 and is preferably constructed of like materials. The basket 2 rests on the support cone 3 at a point on the support cone where the diameter of a bottom opening 31 of the basket 2 roughly equals the diameter of the support cone 3. The basket 2 is not attached or fastened to the support cone 3 in any way, but is instead frictionally held firmly in place on top of the support cone 3 when food product is placed within the basket 2 and both the basket 2 and the support cone 3 are placed within a cooking vessel (best shown in FIG. 4). Due to the weight of the basket 2 and of the food product within the basket 2, as well as the close proximity between the vertical sides 4 of the basket 2 and the inner sides of the cooking vessel as shown in FIG. 4, which proximity minimizes the degree to which the basket 2 can shift position in the cooking vessel, the basket 2 is prevented from disengaging from the support cone 3 during processing of the food product within the vessel. Still referring to FIG. 1, the upper, hook-shaped terminus 5 of the pole 6 of the support cone 3 preferably rises above the circular, open-ended top 7 of the basket 2, and such terminus 5 preferably removably latches into the handle 8 of the basket 2.

Figure 2:
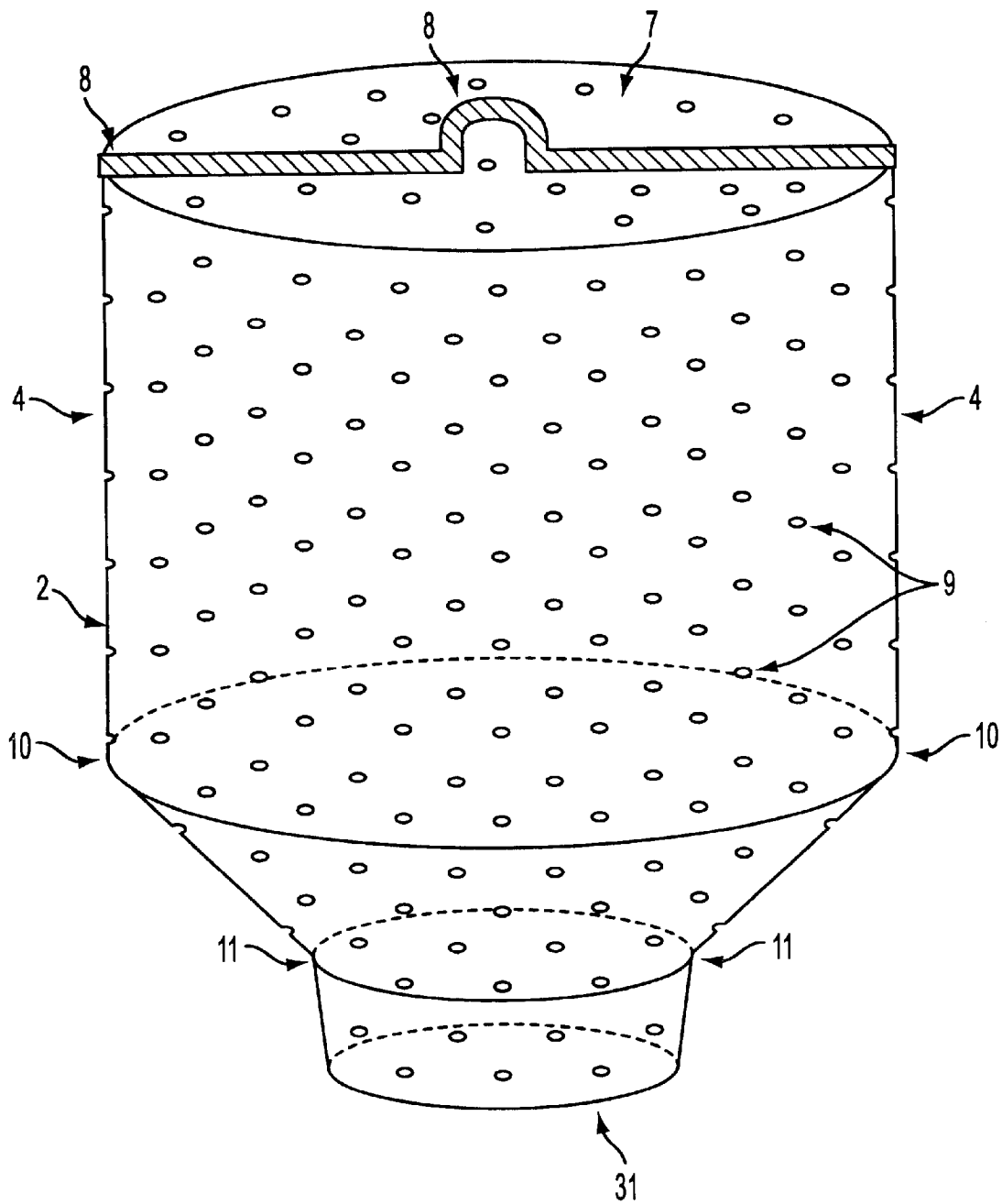
FIG. 2 is an isometric view of the bottom-unloading basket of the steamer apparatus of FIG. 1 according to the invention.

Referring now to FIG. 2, there is shown an isometric view of the bottom-unloading basket 2 of the two-piece steamer apparatus 1 of FIG. 1 shown apart from the support cone 3. The basket 2 of FIG. 2 has a cylindrical shape, an open-ended, circular-shaped top 7, and an open-ended, circular-shaped bottom 31. As will be appreciated by one of ordinary skill in the art, other geometric configurations of the basket 2 (and/or vessel) may be suitable for use with the present invention. Likewise, the physical dimensions and volume of the basket 2 (and/or vessel) may be varied based upon the intended use of the invention. The basket 2 may be made of any material suitable for the basket's intended use. In accordance with a presently preferred embodiment of the invention, the basket 2 is constructed of food-grade stainless steel.

Still referring to FIG. 2, along the diameter of the open top 7 of the basket 2 and integrally connected to the vertical sides 4 of the basket is a handle 8 that is preferably constructed of food-grade stainless steel and that facilitates lifting the basket 2 out of a cooking vessel. The sides 4 of the basket 2 are curved and have a plurality of holes 9, with the sides 4 running in a parallel-downwardly direction from the open top 7 of the basket 2, and then, beginning at a point 10 preferably approximately two-thirds of the vertical height of the basket 2 below the open-ended top 7 of the basket 2, the sides 4 taper inwardly and downwardly at preferably an approximately forty-five degree angle from the center vertical axis of the basket 2. Beginning at a second point 11 preferably approximately nine-tenths of the vertical height of the basket 2 below the open-ended top of the basket 2, the sides 4 taper inwardly and downwardly at preferably an approximately ten degree angle from the center vertical axis of the basket 2 until forming a circular bottom opening 31 of the basket 2, which bottom opening 31 has a diameter that is preferably approximately one-half the diameter of the circular top opening 7 of the basket 2.

Figure 3:
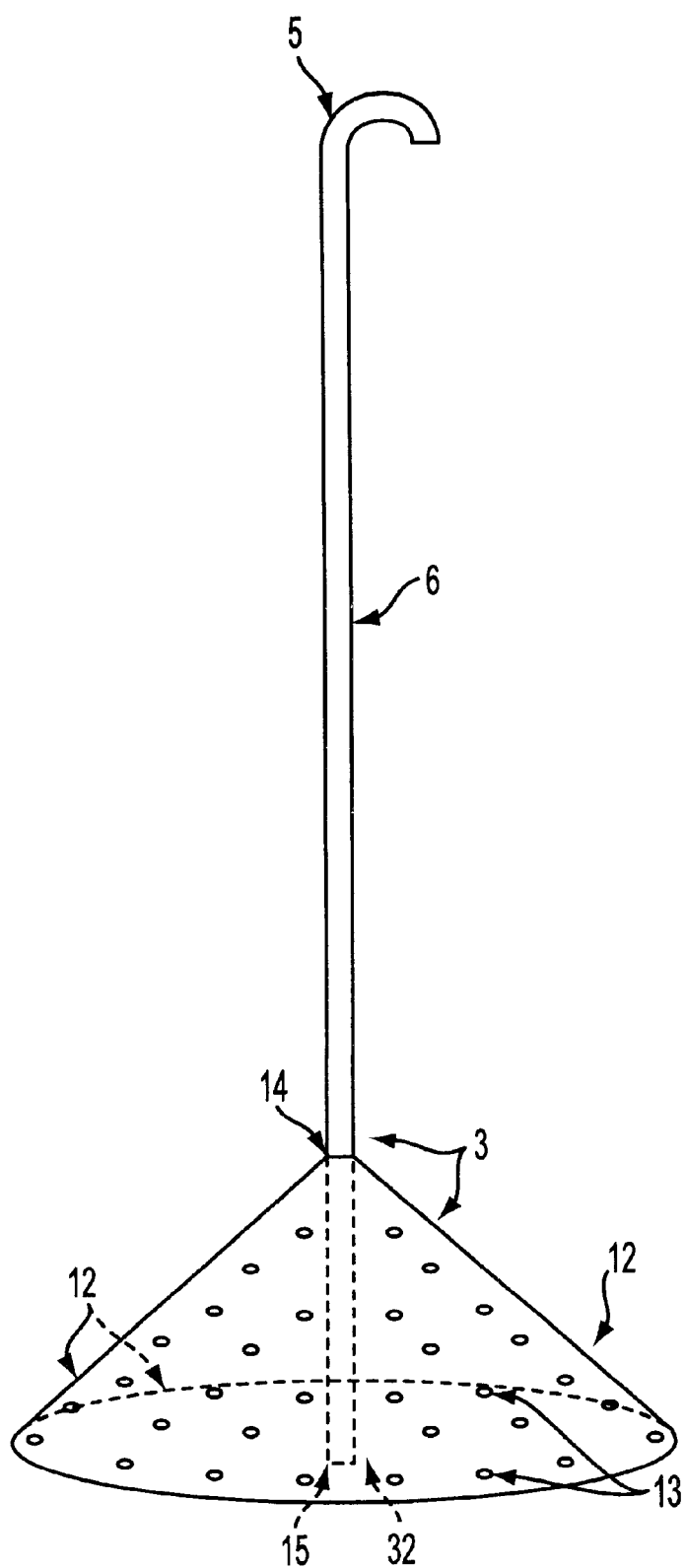
FIG. 3 is an isometric view of the support cone of the steamer apparatus of FIG. 1 according to the invention.

Referring to FIG. 3, there is shown an isometric view of the lower, support cone 3 of the two-piece steamer apparatus 1, shown apart from the upper basket 2. The support cone 3 of a presently preferred embodiment has an inverted generally conical shape and orientation, having curved sides 12 that have a plurality of holes 13, that converge nearly to a point at the top 14 of the support cone 3, and that taper generally downwardly and outwardly at an angle of preferably approximately forty-five degrees from the center vertical axis of the support cone 3. The support cone 3 has a circular, open-ended bottom 32 having a diameter preferably larger than the diameter of the open-ended bottom 31 of the basket 2 but preferably smaller than the diameter of the open-ended top 7 of the basket 2. Integrally connected to the support cone 3 at the top 14 where the curved sides 12 converge is a pole 6 that protrudes above and below the top 14, with the lower terminus 15 of the pole 6 located underneath the sides 12 of the support cone 3 and an upper terminus 5 preferably having a shape that protrudes above the top opening 7 of the basket 2.

Referring to FIG. 4, there is shown an isometric view of an uncovered cooking vessel 16 according to the invention and a cross-sectional view of the two-piece steamer apparatus 1 of FIG. 1 within the cooking vessel 16. The vessel 16 may be constructed of any material suitable for the vessel's intended use. In a presently preferred embodiment, the vessel 16 comprises food-grade stainless steel. The vessel 16 preferably has an integral heating element that enables water within the vessel 16 to be heated into steam. During the steam-cooking process within the vessel 16, the basket 2 rests on top of the support cone 3 at a point on the support cone 3 where the diameter of the bottom opening 31 of the basket 2 is roughly equal to one-half the diameter of the bottom-opening 32 of the support cone 3, thereby holding the food product in the basket 2 preferably above the top of the water level at the bottom of the internal compartment 36 of the vessel 16. Alternatively, culinary steam may be directly introduced into the vessel 16 rather than being produced by heating of water within the vessel 16.

Figure 5:
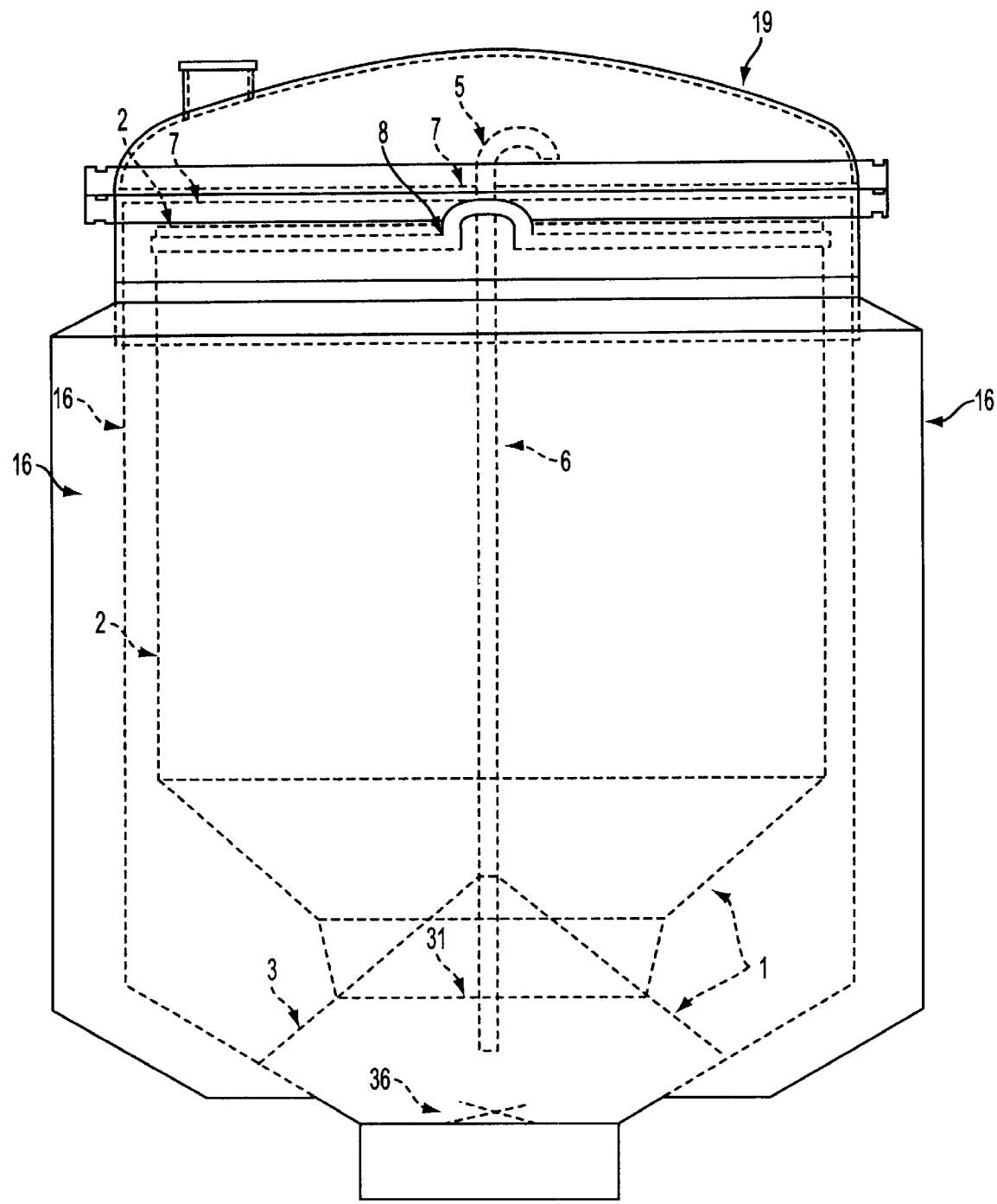
FIG. 5 is a cross-sectional view of the cooking vessel of FIG. 4 with a pressure dome removably fastened onto the cooking vessel and the two-piece steamer apparatus of FIG. 1 placed within the cooking vessel.

Referring now to FIG. 5, there is shown a cross-sectional view of the cooking vessel 16 of FIG. 4 with a pressure dome 19 removably fastened onto the top of the vessel 16 and a cross-sectional view of the two-piece steamer apparatus 1 of FIG. 1 placed within the cooking vessel 16. The pressure dome 19 may be removably attached to the vessel 16 by any suitable means. In the embodiment depicted in FIG. 5, a plurality of clamps that are integrally attached to the top of the vessel 16, thereby maintaining the pressure dome 19 securely but removably fastened to the vessel 16 during the pressurized steam-cooking process. The hook-shaped upper terminus 5 of the pole 6 of the support cone 3 preferably rises above the center of the top opening of the vessel 16, but the upper terminus 5 does not rise so high as to impede the secure fastening of the pressure dome 19 onto the vessel 16.

Figure 6:
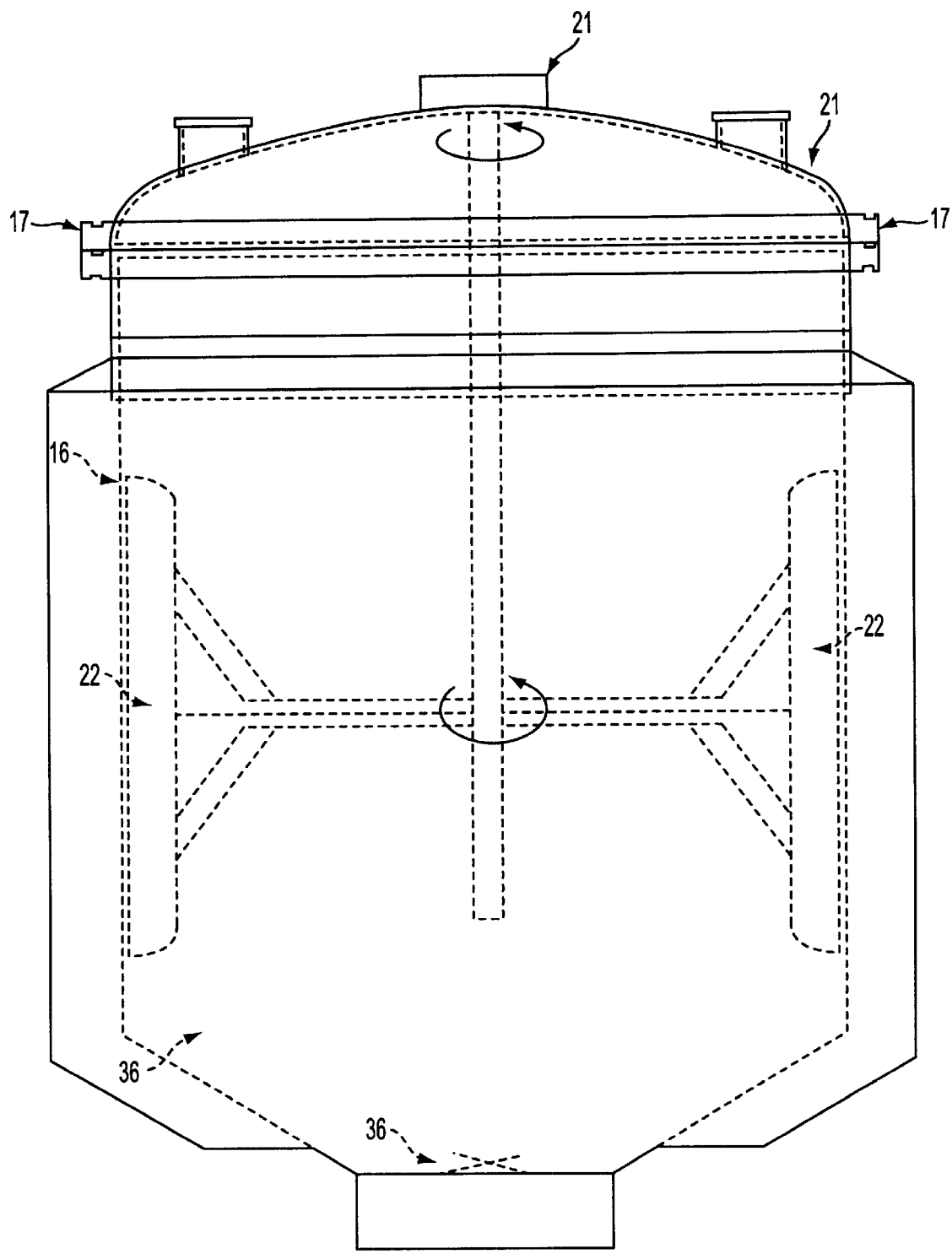
FIG. 6 is a cross-sectional view of the cooking vessel of FIG. 4 with an agitator dome having integrally-connected mixing blades removably fastened onto the cooking vessel and with the two-piece steamer apparatus of FIG. 1 removed from the cooking vessel.

Referring to FIG. 6, there is shown a cross-sectional view of the cooking vessel 16 of FIG. 4 with an agitator dome 21 that has integrally-connected mixing blades 22 removably fastened onto the vessel 16 and that facilitates mechanical mixing of food product within the vessel 16. The two-piece steamer apparatus 1 of FIG. 1 has been removed from the vessel 16. The agitator dome 21 may be removably attached to the vessel 16 by any suitable means. In the embodiment depicted in FIG. 6, a plurality of clamps 17 is integrally attached to the top of the vessel 16, thereby maintaining the agitator dome 21 securely but removably fastened to the vessel 16 during the mechanical mixing process.

Figure 7:
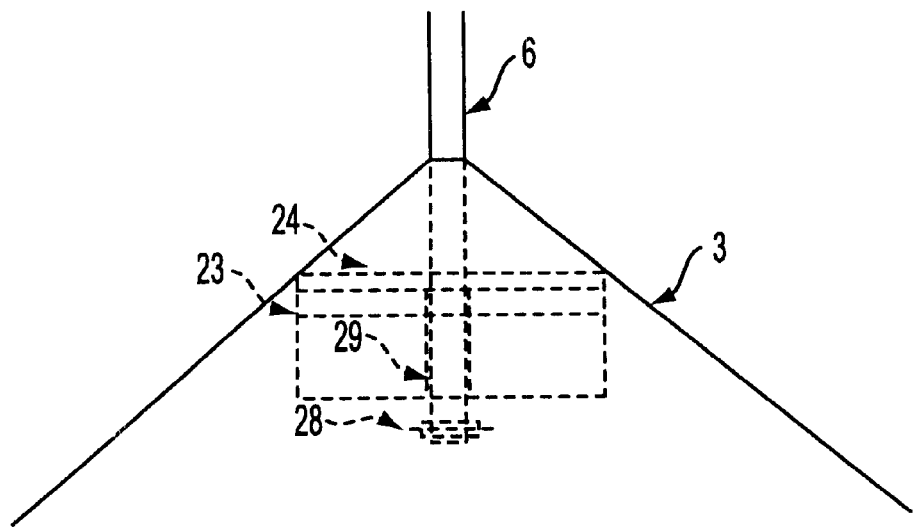
FIG. 7 is a partial perspective view of the support cone of FIG. 3 and a cross-sectional view of a spice container removably fastened onto the pole of the support cone.

Referring now to FIG. 7, there is shown a side view of a spice container 23 and spice container cover 24 removably fastened to the pole 6 of the support cone 3 of FIG. 3 at a point on the pole 6 below the sides 12 of the support cone 3 and preferably just above the lower terminus 29 of the pole 6. A flip lever 28 is shown in the horizontal position.

Figure 8:
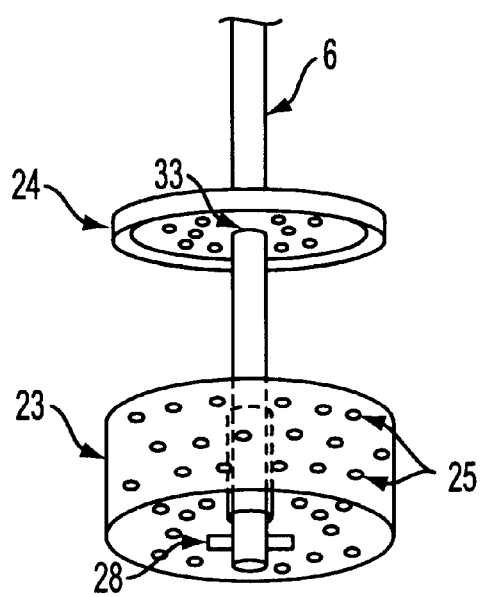
FIG. 8 is an isometric view of a lower portion of the pole of the support cone of FIG. 3 and the spice container of FIG. 7 and a spice container cover.

Referring now to FIG. 8, there is shown an isometric view of a lower portion of the pole 6 of the support cone 3 of FIG. 3 and the spice container 23 of FIG. 7 and spice container cover 24. The spice container 23 preferably has a hollow donut shape with a cylindrically-shaped shaft opening 33 through and along the entire length of its central vertical axis, said opening 33 having a uniform diameter preferably slightly larger than the diameter of the pole 6 of the support cone 3. The pole 6 passes through the opening 33 of the spice container 23 and the spice container cover 24. The spice container 23 has a plurality of small holes 25 throughout its bottom surface 26 and sides 27 to allow heated water or steam to pass through, an inner compartment 28 in which spices and flavorings may be placed, and a removable cover 24 also having a plurality of small holes 25 and an opening through the central vertical axis having a diameter preferably slightly larger than the diameter of the pole 6 of the support cone 3. Also shown in FIG. 8 is a flip lever 28 that is preferably integrally connected to the pole 6 just above the lower terminus 29 of the pole 6. The flip lever 28 preferably comprises a hinged section of the pole 6 which can be locked either into a horizontal position perpendicular to the orientation of the pole 6 or into a vertical position parallel to the orientation of the pole 6. In the horizontal position, the flip lever 28 prevents the spice container 23 from moving any further down the pole 6, while in the vertical position the flip lever 28 enables the spice container 23 to be removed from the pole 6.

Figure 9:
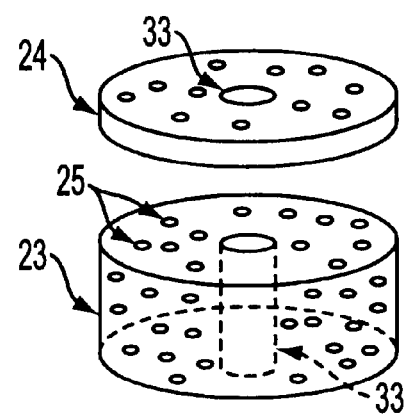
FIG. 9 is another isometric view of the spice container and spice container cover of FIG. 8.

Referring now to FIG. 9, there is shown another isometric view of the spice container 23 and spice container cover 24 of FIG. 8. In FIG. 9, the cylindrically-shaped center shaft opening 30 of the spice container 23 and the opening of the spice container cover 24 can be seen.

Figure 10:
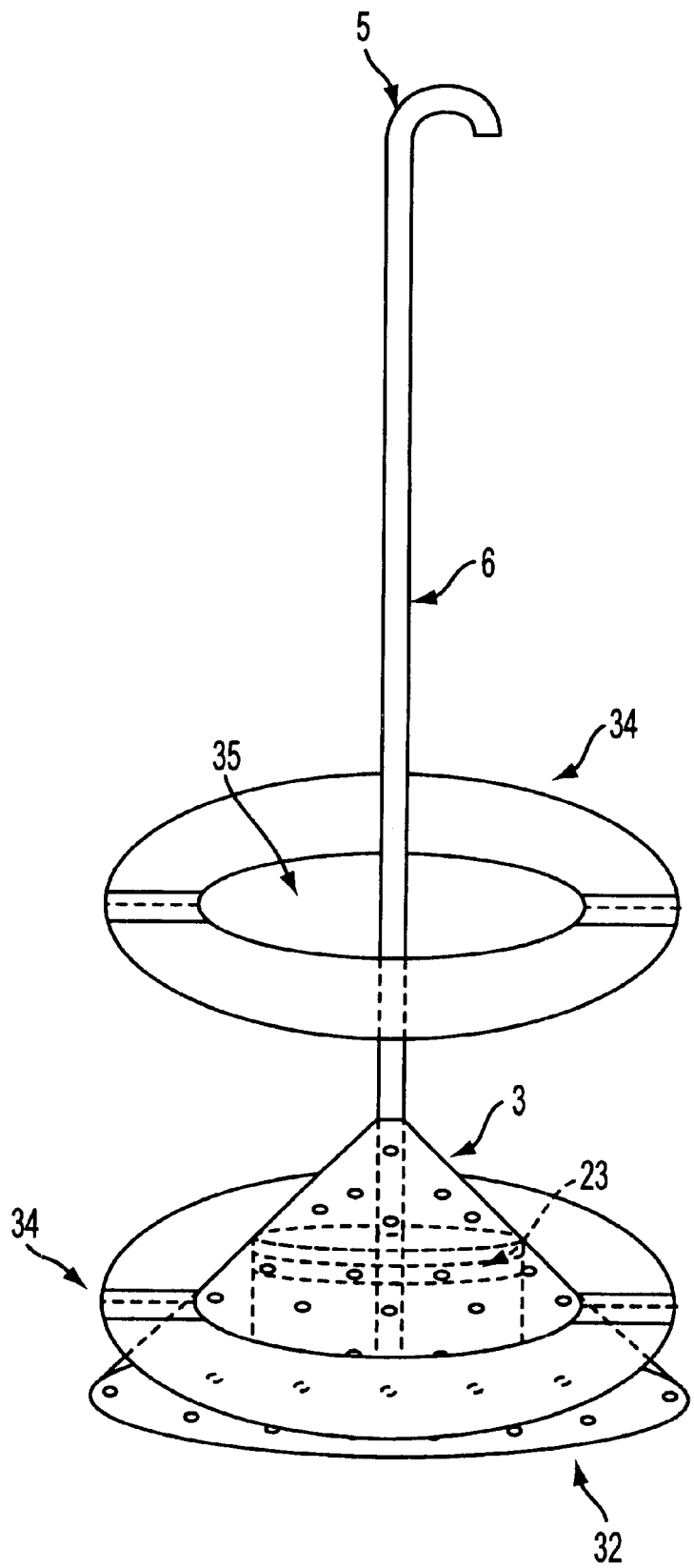
FIG. 10 is an isometric view of the support cone and spice container of FIG. 7 and a spice ring positioned on top of the support cone.

Referring now to FIG. 10, the spice container 23 and support cone of FIG. 9 are depicted together with a perforated spice ring 34 that is depicted both being lowered onto the top of the support cone 3 and resting on the support cone 3. The spice ring 34 has a circular, flattened donut shape with an inner compartment for holding spices and flavorings. The spice ring 34 has a center opening 35 having a diameter approximately one-half the diameter of the bottom opening 32 of the support cone 3, and the spice ring 34 rests on the sides 12 of the support cone 3 at a point approximately equidistant between the top 14 of the support cone 3 and the bottom opening 32 of the support cone 3, thereby facilitating the positioning of the bottom opening 31 of the basket 2 above the top of the water level in the vessel 16. The spice ring 34 is not attached or fastened to the support cone 3 in any way, but is instead frictionally held firmly in place on top of the support cone 3 when food product is placed within the basket 2 and both the basket 2 and the support cone 3 are placed within a cooking vessel (best shown in FIG. 4).

Figure 11:
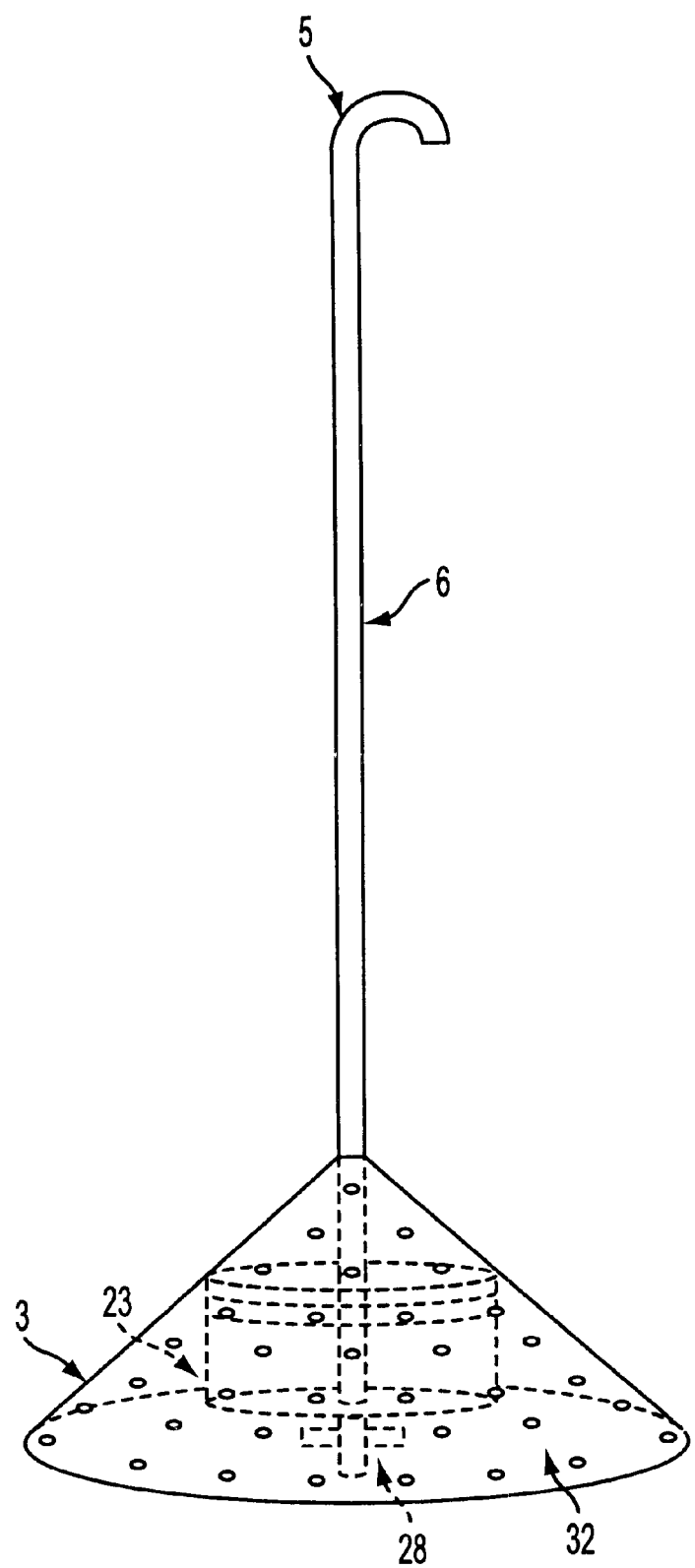
FIG. 11 is an isometric view of the spice container of FIG. 7 removably fastened onto the support cone of FIG. 3.

Referring to FIG. 11, there is shown an isometric view of the spice container 23 of FIG. 7 removably fastened onto the pole 6 of the support cone 3 of FIG. 3 at a point on the pole 6 just above the lower terminus 29 of the pole 6. The spice container 23 is held in place on the pole 6 by virtue of a flip lever 28 oriented into the horizontal position.

In operation, a measured quantity of potable water is introduced into the bottom of the interior compartment 36 of the uncovered cooking vessel 16 of FIG. 4. Spices are placed into the spice container 23 of FIG. 7 and the spice container cover 24 is removably fastened onto the spice container 24. The covered spice container 23 is removably fastened onto the pole 6 of the support cone 3 of the two-piece steamer apparatus 1 of FIG. 1 and the flip lever 28 is placed into a horizontal position relative to the pole 6. The support cone 3 with removably attached spice container 23 is placed into the vessel 16 so that the bottom of the sides 12 of the support cone 3 are resting on the interior bottom surface of the vessel 16. The basket 2 is placed within the vessel 16 so that the basket 2 rests on top of the support cone 3 at the point where the diameter of the bottom opening 31 of the basket 2 is approximately equal to one-half the diameter of the bottom opening 32 of the support cone 3. Food product, such as uncooked sweet potato or pumpkin, is then placed into the basket 2 so that the food product within the basket 2 is above the top of the water level within the vessel 16. The pressure dome 19 of FIG. 5 is removably fastened onto the top of the vessel 16, the pressure within the vessel 16 is raised to the desired level, and the water in the vessel 16 is heated into steam or, alternatively, culinary steam is introduced into the vessel 16.

Upon completion of the steam-cooking process within the vessel 16, the pressure dome 19 is unfastened from the vessel 16 and the basket 2 is lifted out of the vessel 16 by pulling upward on the handle 8 of the basket 2. As the basket 2 is lifted up, the food product within the basket 2 is released through the bottom opening 31 of the basket 2 and directly into the interior compartment 36 of the vessel 16. Once the basket 2 has been removed from the vessel 16, the support cone 3 is then lifted up and out of the vessel 16 by pulling upward on the hook-shaped upper terminus 5 of the pole 6 of the support cone 3. The inverted conical shape of the support cone 3 facilitates the upward movement of the support cone 3 through the cooked food product and out of the vessel 16. Because the spice container 23 is removably fastened to the pole 6 of the support cone 3 near the lower terminus 29 of the pole 6, the spice container 23 is removed from the cooking vessel 16 simultaneously with the removal of the support cone 3 from the vessel 16. Once the support cone 3 has been removed from vessel 16, the agitator dome 21 of FIG. 6 is removably fastened onto the top of the vessel 16 with the plurality of clamps, and mechanical mixing of the food product within the vessel 16 proceeds.

While the foregoing describes what are considered to be preferred embodiments of the present invention, it is understood that various modifications may be made thereto and that the invention may be implemented in various forms and embodiments, and that it may be applied in numerous applications, only some of which have been described herein. It is intended by the following claims to claim all such modifications and variations which fall within the true scope of the invention.

What is claimed is:

1. An apparatus for processing a solid or semi-solid product comprising two unfastened pieces, an upper piece and a lower piece, adapted for insertion into a vessel, wherein:

said upper piece is a bottom-unloading basket having a top opening for accepting said product and a bottom opening for discharging said product directly into said vessel after a first processing operation;

said lower piece is a support base configured to mate with said bottom opening of said basket, whereby when said basket and said support base are mated within said vessel, the product is prevented from exiting the basket through said bottom opening of said basket;

said basket is adapted for removable insertion into said vessel, such that following completion of said first processing operation, said basket may be unmated from said support base and separately removed from said vessel, thereby causing said product to be released through said bottom opening of the basket directly into said vessel and enabling the basket to be easily removed from the vessel without also having to remove the product from the vessel;

said support base is adapted for removable insertion into said vessel and has a bottom having a diameter significantly smaller than the internal diameter of the vessel, such that after removal of said basket from said vessel following completion of the first processing operation, said support base may then be easily lifted up through said released product and removed from said vessel without having to remove the product from the vessel; and following removal of said basket and said support base from said vessel, said product may then be subjected to further processing operations within said vessel.

2. The product processing apparatus of claim 1, wherein said basket and said support base have steam-permeable sides.

3. The product processing apparatus of claim 1, wherein:

said support base has an inverted generally conical shape and sides that taper downwardly and outwardly from a top point to a generally circular, open-ended bottom, said support base bottom having a diameter larger than the diameter of said bottom opening of said basket but significantly smaller than the internal diameter of said vessel; and said basket having a generally cylindrical shape, an open-ended, generally circular-shaped top, and an open-ended, generally circular-shaped bottom.

4. The product processing apparatus of claim 3, wherein:

said sides of said basket and said support base are perforated with a plurality of holes; and the sides of said basket run in a generally parallel-downwardly direction from said open top of the basket and then beginning at a point approximately two-thirds of the height of the basket below the open-ended top of the basket, said sides of said basket taper generally inwardly and downwardly until forming said generally circular-shaped bottom opening of the basket having a diameter smaller than the diameter of the bottom opening of the support base.

5. The product processing apparatus of claim 3, wherein said support base has a vertically-oriented pole integrally-connected to said top point of the support base, said pole having a lower terminus extending downward of the sides of the support base and an upper terminus extending upward of the top of the support base.

6. The product processing apparatus of claim 5, wherein said upper terminus of said pole is hook-shaped.

7. The product processing apparatus of claim 2, wherein said basket has a handle integrally connected to said sides of said basket and running along a diameter of said top opening of said basket.

8. The product processing apparatus of claim 6, further comprising:

a flip lever integrally connected to said pole of the support base proximate to the lower terminus of the pole, said flip lever having either a horizontal or vertical position; and a spice container that is perforated with a plurality of holes and that may be removably fastened to the pole of the base section just above said flip lever when the flip lever is in the horizontal position.

9. The product processing apparatus of 3, wherein:

said sides of said basket and said support base are perforated with a plurality of holes that allow steam and liquids to pass through said sides; and the sides of said basket run in a generally parallel-downwardly direction from said open top of the basket and then beginning at a point above or below two-thirds of the height of the basket below the open-ended top of the basket, said sides of the basket taper generally inwardly and downwardly until forming said generally circular-shaped bottom opening of the basket having a diameter smaller than the diameter of the bottom opening of the support base.

10. The product processing apparatus of claim 3, wherein:

said sides of said basket and said support base are perforated with a plurality of holes that allow steam and liquids to pass through said sides; and the sides of said basket run in a generally parallel-downwardly direction from said open top of the basket and then beginning at a point approximately midway between the top and bottom of said basket, said sides of the basket taper generally inwardly and downwardly until forming said generally circular-shaped bottom opening of the basket having a diameter smaller than the diameter of the bottom opening of the support base.

11. The product processing apparatus of claim 3, wherein:

said sides of said basket and said support base are perforated with a plurality of holes that allow steam and liquids to pass through said sides: and the sides of said basket run in a generally parallel-downwardly direction from said open top of the basket and then beginning at a point approximately three-quarters of the height of the basket below the open-ended top of the basket, said sides of the basket taper generally inwardly and downwardly until forming said generally circular-shaped bottom opening of the basket having a diameter smaller than the diameter of the bottom opening of the support base.

* * * * *